Feb. 10, 1953  K. M. ADAIR  2,627,871
DRAIN AND FLUSH VALVE
Filed April 3, 1950
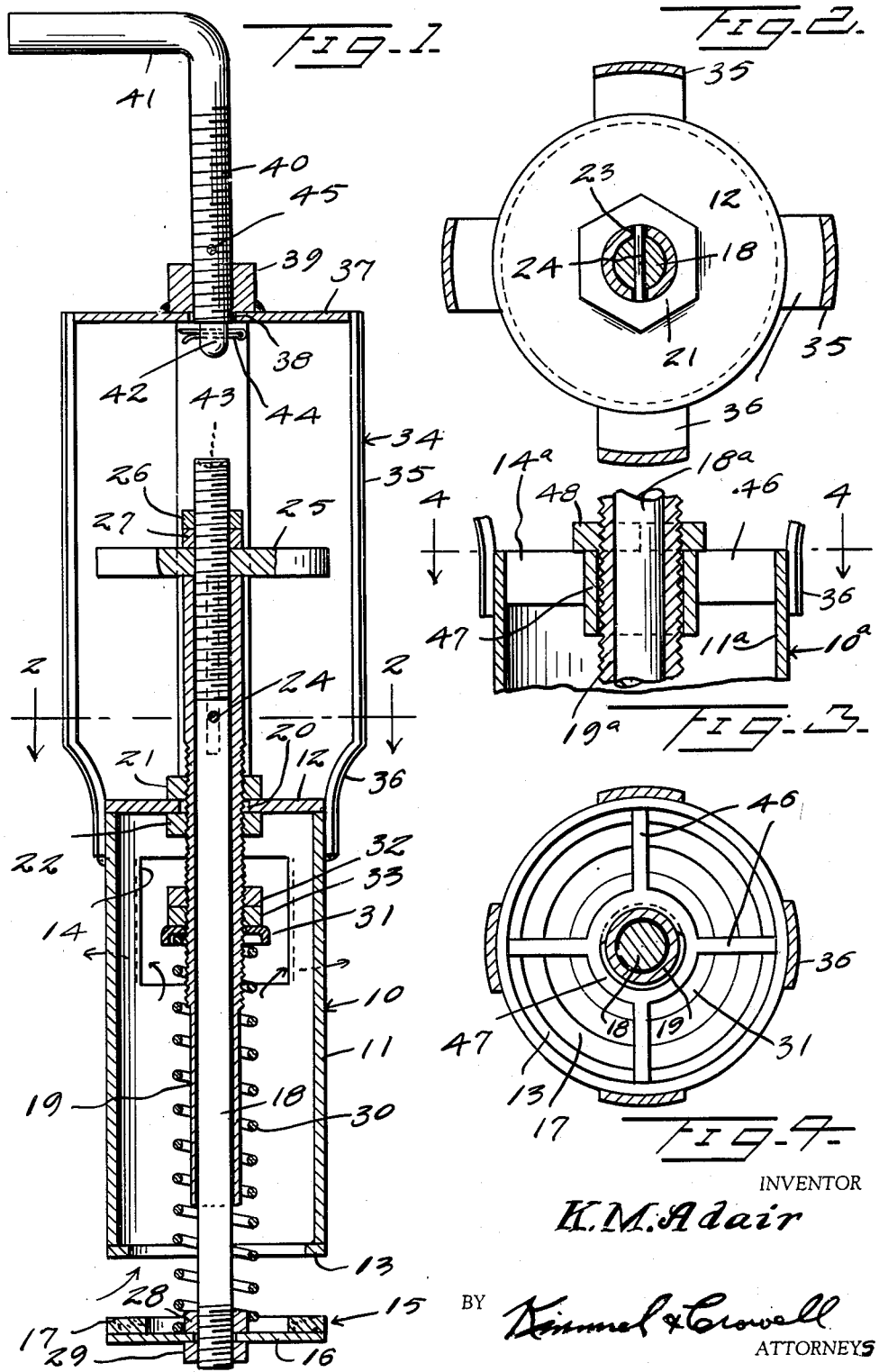
INVENTOR
K. M. Adair
BY
Kimmel & Crowell
ATTORNEYS

UNITED STATES PATENT OFFICE 2,627,871

DRAIN AND FLUSH VALVE

Keith M. Adair, Eugene, Oreg.

Application April 3, 1950, Serial No. 153,747

1 Claim. (Cl. 137—517)

This invention relates to the flushing and draining of irrigation and like lines. Such lines may be either fixed or portable, permanent or temporary installations.

When irrigation lines are moved or through their normal use there is often introduced therein a quantity of soil or sediment, which, if not flushed out of such lines, may foul the sprinklers or other discharge outlets of the system. It is, therefore, important for the efficient operation of such systems that they be easily and efficiently flushed, and such sediment expelled therefrom.

In the use of portable irrigation systems it is necessary that the lines be drained of water before transportation because of the greatly increased weight caused by water contained in such systems. If there is no ordinary valve which will allow the flushing and draining of such systems, it becomes necessary for the operator thereof to go to the low portions of the line and very likely to the end of such line in order to open the line for the release of the water contained therein.

It is very advantageous to the operator to save the time and labor necessary to manually open these lines, and it is for this purpose that I have invented an automatic draining and flushing valve for irrigation systems.

The principal object of this invention is to provide a valve for draining and flushing irrigation systems which valve is fully automatic.

It is the further object of this invention to provide a valve with a wing nut on the valve stem which makes it possible to close the valve manually and to thus fix it in the closed position.

It is another object of this invention to provide a valve with a means whereby said valve may be manually locked in the open position at any degree of opening that may be desired.

A further object of this invention is to provide a device in which the spring tension adjustment for the valve may be made without removing any of the parts of that valve.

It is another object of my invention to provide a valve that will be inexpensive to manufacture, easily maintained, and will last indefinitely.

Another object of my invention is to provide a valve so designed as to enable its easy adaptability to standard irrigation systems, both permanent and portable, in use today. The valve body of my invention may be easily incorporated into an irrigation line itself anywhere along its length, or it may be fixed into the average irrigation coupler, or it may be provided with lugs or locks or some other locking means in order to easily use it in an irrigation system.

Another object of this invention is to produce a valve body that will accommodate either pipe or tube fittings whereby said valve can be used as a regular valve in the standard irrigation system, whether fixed or portable.

With the above and other objects in view, my invention consists in the arrangement, combination and details of construction disclosed in the drawings and specification, and then more particularly pointed out in the appended claim.

In the drawing:

Figure 1 is a vertical section of a drain and flush valve constructed according to an embodiment of this invention.

Figure 2 is a sectional view taken on the line 2—2 of Figure 1.

Figure 3 is a fragmentary vertical section of a modified form of this invention.

Figure 4 is a sectional view taken on the line 4—4 of Figure 3.

Referring to the drawing, the numeral 10 designates generally a valve housing formed of a side wall 11 and a top wall 12. The bottom or lower end of the housing 10 includes an annular valve seat 13, and at a point between the upper and lower ends of the housing 10 an outlet opening 14 is formed in the side wall 11. The lower end of the housing 10 is open and constitutes the intake end of the housing. A valve plug member 15 is adapted to be disposed when in closed position against the seat 13 and comprises a disc 16 having a resilient gasket 17 secured to the upper side thereof.

The valve member 15 also includes an upwardly projecting stem 18 which is slidable in a sleeve or guide 19 threaded through the top wall 12. In the present instance the top wall 12 is formed with an opening 20 through which the sleeve or guide 19 loosely engages, and upper and lower lock nuts 21 and 22, respectively, are threaded onto the sleeve or guide 19 and engage on opposite sides of the top wall 12. The sleeve or guide 19 is formed with a pair of diametrically opposed longitudinally extending slots 23 within which a pin 24 extending through the stem 18 slidably engages. The pin 24 is adapted to hold the valve stem 18 against rotation within the guide 19. A valve stem adjusting wheel 25 is threaded onto the stem 18 and is adapted to normally bear against the upper end of the guide 19. A pair of lock nuts 26 and 27 which are threaded onto the stem 18 hold the wheel 25 against turning movement and lock this wheel in adjusted position.

The disc 16 is secured to the lower end of the stem 18 by means of upper and lower nuts 28 and 29, respectively, which are threaded onto the stem 18. A spring 30 engages about the guide 19 and bears at its lower end against the upper side of the disc or plate 16, and bears at its upper end against an inverted cup shaped washer 31 disposed about the guide 19 and held against upward movement relative to the guide 19 by means of a pair of lock nuts 32 and 33.

A cage generally designated 34 is fixed to and extends upwardly from the valve housing 10 and includes upwardly projecting bars 35 which are formed with inwardly offset lower end portions 36 fixed as by welding or the like to the upper end of the valve housing 10. The upper ends of the bars 35 are fixed to an upper disc shaped plate 37 which is formed with a central opening 38. A nut 39 is fixed as by welding or the like to the plate 37 and a valve opening bolt 40 is threaded through the nut 39. The bolt 40 is formed at its upper end with a right angularly disposed crank or handle 41, and the lower end of the bolt 40 is formed with a reduced diameter stud 42 which is adapted upon inward movement of the bolt 40 to engage with a concave recess 43 formed in the upper end of the valve stem 18.

The bolt 40 is held against complete threading from the nut 39 by means of a cotter pin 44 which is extended through the stud 42 on the lower side of the plate 37. The bolt 40 is also formed with a transversely extending opening 45 through which a second cotter pin or the like may be extended so that the bolt 40 will be held against inward movement so that the bolt 40 will not normally contact with the upper end of the valve stem 18.

Referring now to Figures 3 and 4, there is disclosed a slightly modified form of this invention wherein the valve housing 10a is constructed similar to the valve housing 10 with the exception that the outlet opening 14a of the valve housing 10a is formed at the upper end of the valve housing, and a spider 46 is secured in the upper end of the side wall 11a of the housing 10a and includes a cylindrical guide 47 through which the valve stem guide 19a is threaded. A nut 48 is threaded on the guide 19a and bears against the guide or fixed nut 47. The guide 19a has slidable therein a valve stem 18a which is identical with the valve stem 18. In other respects, the structure shown in Figures 3 and 4 is identical with the structure shown in Figures 1 and 2.

In the use and operation of this valve structure, the housing 10 is secured to a pipe or conduit in an irrigation system, and when the water is normally flowing through the system the pressure of the water against the valve member 15 will force this valve member to closed position. When it is desired to drain the system particularly where the pipes are of a portable nature, release of pressure against the valve member 15 will permit the spring 30 to move valve member 15 to an open position. If it is desired to manually open the valve structure, crank 41 is turned so as to move bolt 40 inwardly to bear against the upper end of valve stem 18.

Valve member 15 may thereupon be moved to the open position determined by the adjustment of wheel or wing 25. With a valve structure as hereinbefore described the irrigation system, either portable or stationary, may be automatically drained so that where the pipes in the system are portable and are being moved from one point to another, the water, silt, or the like, will automatically drain from the irrigation system. In this manner the pipes will not be loaded with water, or with silt, or other sediment which frequently accumulates in the system.

When it is desired to flush an irrigation system, the water is pumped through the system at a reduced pressure, thus washing out of the lines all dirt, silt, or other foreign solid matter. Once the lines are flushed, the pressure can be increased to working pressure, which will be sufficient pressure to cause the valve to automatically close.

I do not mean to confine myself to the exact details of construction herein disclosed, but claim all variations falling within the purview of the appended claim.

What is claimed is:

A drain valve structure for use in an irrigation system, comprising a tubular housing having an inlet opening at one end and an apertured closure at the other end insertible in a pipe of said system, said housing having an outlet in the side wall thereof adapted to be positioned exteriorly of said pipe, a valve disc for closing said inlet opening, a valve stem secured to said disc and extending through said housing, a tubular guide extending through the aperture in said closure surrounding said stem, a washer on said guide, a coil spring surrounding said stem positioned between said washer and said disc biasing said disc toward open position, a central wheel threadedly engaging said stem and biased into engagement with the top of said guide by said spring, rotation of said wheel varying the relative position of said stem and guide to vary the compression of said spring, uprights extending from said housing, an apertured disc supported by said uprights, a nut secured to said disc, a bolt threaded through said nut and engageable with said valve stem for manual opening thereof, and an operating handle for said bolt.

KEITH M. ADAIR.

REFERENCES CITED

The following references are of record in the file of this patent:

UNITED STATES PATENTS

| Number | Name | Date |
| --- | --- | --- |
| 547,506 | Sleigh | Oct. 8, 1895 |
| 984,994 | Armstrong | Feb. 21, 1911 |
| 1,420,559 | Knight | June 20, 1922 |
| 2,204,757 | Henze | June 18, 1940 |

FOREIGN PATENTS

| Number | Country | Date |
| --- | --- | --- |
| 547,506 | France | of 1895 |